United States Patent [19]
Brennan et al.

[11] Patent Number: 4,739,688
[45] Date of Patent: Apr. 26, 1988

[54] BOILER REPAIR

[75] Inventors: Matthew T. Brennan, Wayland; James A. Moruzzi, Norfold, both of Mass.

[73] Assignee: SMA Controls, Inc., Medfield, Mass.

[21] Appl. No.: 916,302

[22] Filed: Oct. 7, 1986

[51] Int. Cl.$^4$ ............................................. B23D 45/12
[52] U.S. Cl. ........................................ 83/745; 83/490; 83/547; 29/157.3 R; 29/157.4; 29/402.08
[58] Field of Search .................. 83/745, 490, 547; 29/157.3, 157.4, 402.08; 125/13, 14

[56] References Cited

U.S. PATENT DOCUMENTS

| | | | |
|---|---|---|---|
| 2,014,229 | 12/1935 | Emmons | 125/13 |
| 2,214,141 | 9/1940 | Mall | 51/241 |
| 2,589,554 | 3/1952 | Killian | 83/745 |
| 2,818,892 | 1/1958 | Price | |
| 2,921,492 | 1/1960 | Worth | 83/471 |
| 2,973,576 | 3/1961 | Hentke | 30/42 |
| 3,046,707 | 7/1962 | Obear | 51/178 |
| 3,378,307 | 4/1968 | Dempsey | 299/75 |
| 3,722,497 | 3/1973 | Hiestand | 125/14 |
| 4,091,699 | 5/1978 | Chaze | 83/56 |
| 4,181,054 | 1/1980 | Striebig | 83/153 |
| 4,320,566 | 3/1982 | Boyer | 29/157.4 |
| 4,633,555 | 1/1987 | Legge | 29/157.4 |

Primary Examiner—Donald R. Schran

[57] ABSTRACT

Boiler tube panel removal apparatus includes elongated guide rail structure for securing to a boiler tube panel adjacent a desired cut region, and a cutting tool assembly for mounting on the guide rail structure. The cutting tool assembly includes a support carriage with spaced guide structure for engaging the guide rail structure, main pivot structure secured to the support carriage having a pivot axis extending transversely to the guide rail structure, secondary pivot structure secured to the support carriage, and plunge cut link structure mounted on the secondary pivot structure. A cutting tool that is mounted on the main pivot includes a drive motor, a manual motor control, a drive shaft and a tube cutter disc mounted on the drive shaft. Manual operation of the plunge cut link structure rotates the cutting tool about the main pivot axis in plunge cutting action through a panel of tubes adjacent the guide rail structure.

21 Claims, 3 Drawing Sheets

BOILER REPAIR

This invention relates to repair of boilers and the like, and more particularly to methods and apparatus for removing a panel of boiler tubes for replacement.

Steam generation systems in modern power plants include boilers with banks of steel (and other alloys) tubes that extend vertically for distances frequently in excess of one hundred feet. Such tubes have outer diameters of up to three inches and more with wall thickness of up to about one-half inch, adjacent tubes being connected together with metal membranes. Such tube walls deteriorate due to corrosion and the like, and panel portions of such boiler tube walls require periodic replacement. Typically, repair of such defective boiler tube panels has involved removal of the tube panel by flame cutting, finishing the ends of the cut tubes, and then inserting and welding in place a replacement panel of tubes—an expensive and time consuming process. Prior attempts to saw through such tube walls have not been successful as the saw, due to the size and materials of the boiler tubes, cannot be held with sufficient stability to provide a straight cut line by advancing the saw along the line to be cut either by hand or on an appropriate support.

In accordance with one aspect of the invention, there is provided boiler tube panel removal apparatus that includes elongated guide rail structure for securing to a boiler tube panel adjacent a desired cut region, and a cutting tool for mounting on the guide rail structure, the cutting tool including a support carriage with spaced guide structure for engaging the guide rail structure, main pivot structure secured to the support carriage having a pivot axis extending transversly to the guide rail structure, a cutting tool mounted on the main pivot that includes a drive motor, a manual motor control, a drive shaft and a tube cutter disc mounted on the drive shaft at right angles to the main pivot axis; secondary pivot structure secured to the support carriage, plunge cut link structure mounted on the secondary pivot structure that includes a first link connected to the cutting tool and a second link connected between the first link and the secondary pivot axis for manually rotating the cutting tool about the main pivot axis in plunge cutting action through a panel of tubes adjacent the guide rail structure and brake structure for enagement with the guide rail structure to lock the support carriage relative to the panel of boiler tubes during the plunge cutting operation.

In accordance with another aspect of the invention, there is provided a process for cutting a series of boiler tubes that includes the steps of mounting elongated guide rail structure on a boiler tube panel adjacent a desired cut region, disposing a cutting tool assembly on the guide rail structure, the cutting tool including a tube cutting disc disposed parallel to the guide rail structure, fixedly positioning the cutting tool assembly on the guide rail structure, and moving the cutting tool about a fixed pivot axis in a plunge cutting action to cut through the panel of boiler tubes.

The tube cutting process and apparatus of this invention provides straight and precise cutting of a panel of boiler tubes with resulting smooth aligned tube end surfaces so that those tube end sufaces can be quickly and accurately prepped for insertion and welding of a replacement boiler tube panel.

In preferred embodiments, the tube cutting apparatus includes manually releasable latch structure for holding the cutting tool in raised position, and stabilizing structure on the support carriage for storing the cutting tool assembly in upright position when not in use. In a particular embodiment, the stabilizing structure includes an arm that projects laterally from the longitudinal frame member beneath the cutting tool, the plunge cut link structure includes a coupling which is slidingly received on the second link, and the manually releasable latch structure latches the plunge cut coupling and first link together.

Also in that particular embodiment, the elongated guide rail structure is secured to the boiler tube panel by a plurality of rail supports, each rail support includes an alignment projection whose end is adapted to be positioned immediately adjacent the desired cut line on the boiler tube panel, and a body portion which is adapted to be secured to a boiler tube surface and which carries upstanding rail fastening means. The support carriage includes a longitudinal frame member, a forward transverse frame member on which the secondary pivot structure and a first pair of spaced guide wheels are mounted, and a rear transverse frame member on which the main pivot structure and a second pair of spaced guide wheels are mounted, each guide wheel having a V-groove that engages a correspondingly shaped guide surface of the guide rail. The brake structure includes a brake shoe and an operating member, the shoe being movable by the operating member between a disengaged position and an engaged position in which the shoe is engaged with the surface of the guide rail to lock the cutting tool assembly in place on the rail.

Other features and advantages of the invention will be seen as the following description of a particular embodiment progresses, in conjunction with the drawings, in which.

DESCRIPTION OF PARTICULAR EMBODIMENT

Figure 1:
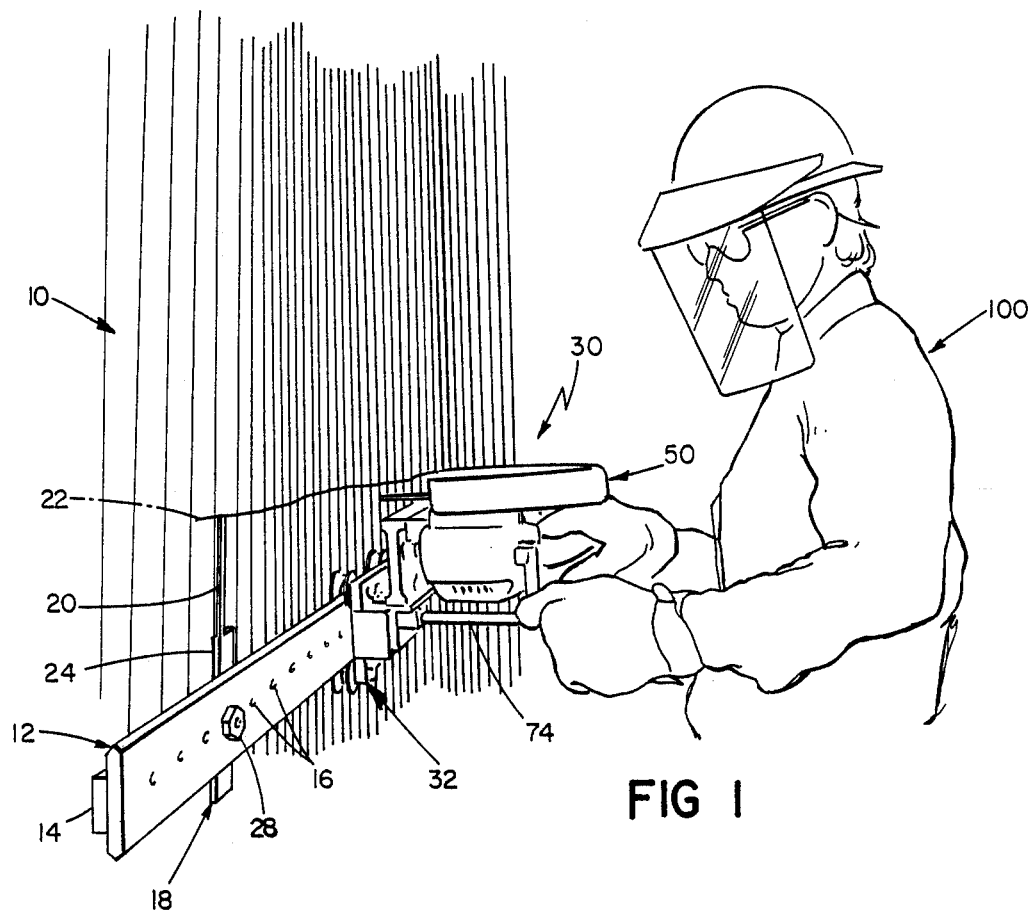
FIG. 1 is a perspective view of a boiler tube panel cutting system in accordance with the invention.
Figure 2:
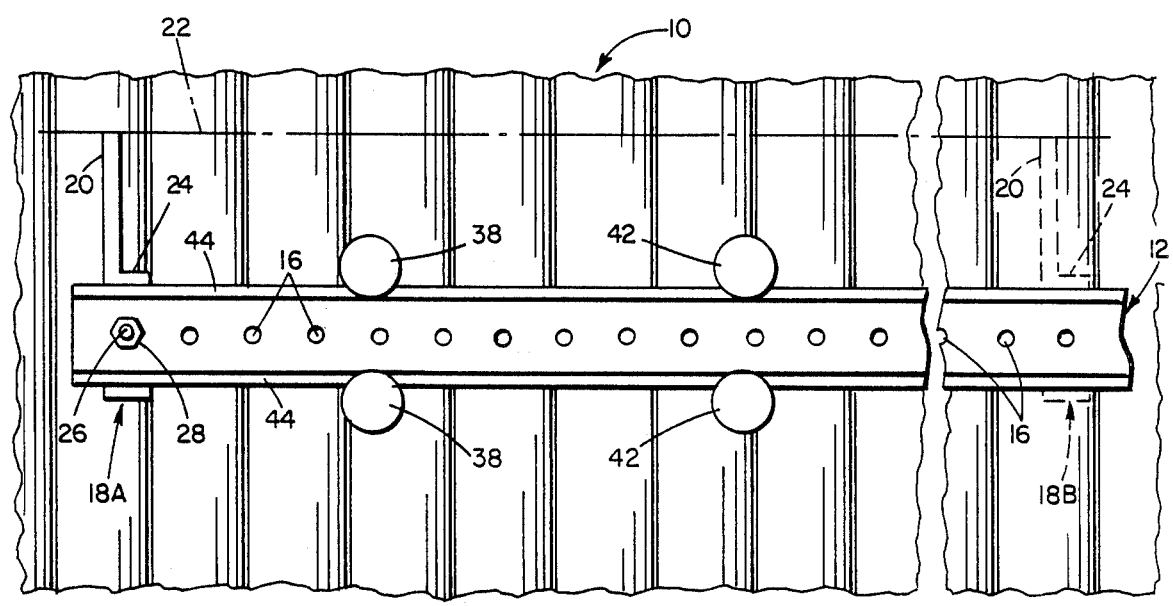
FIG. 2 is a side elevational view of the elongated guide rail component of the boiler tube cutting system of FIG. 1.
Figure 3:
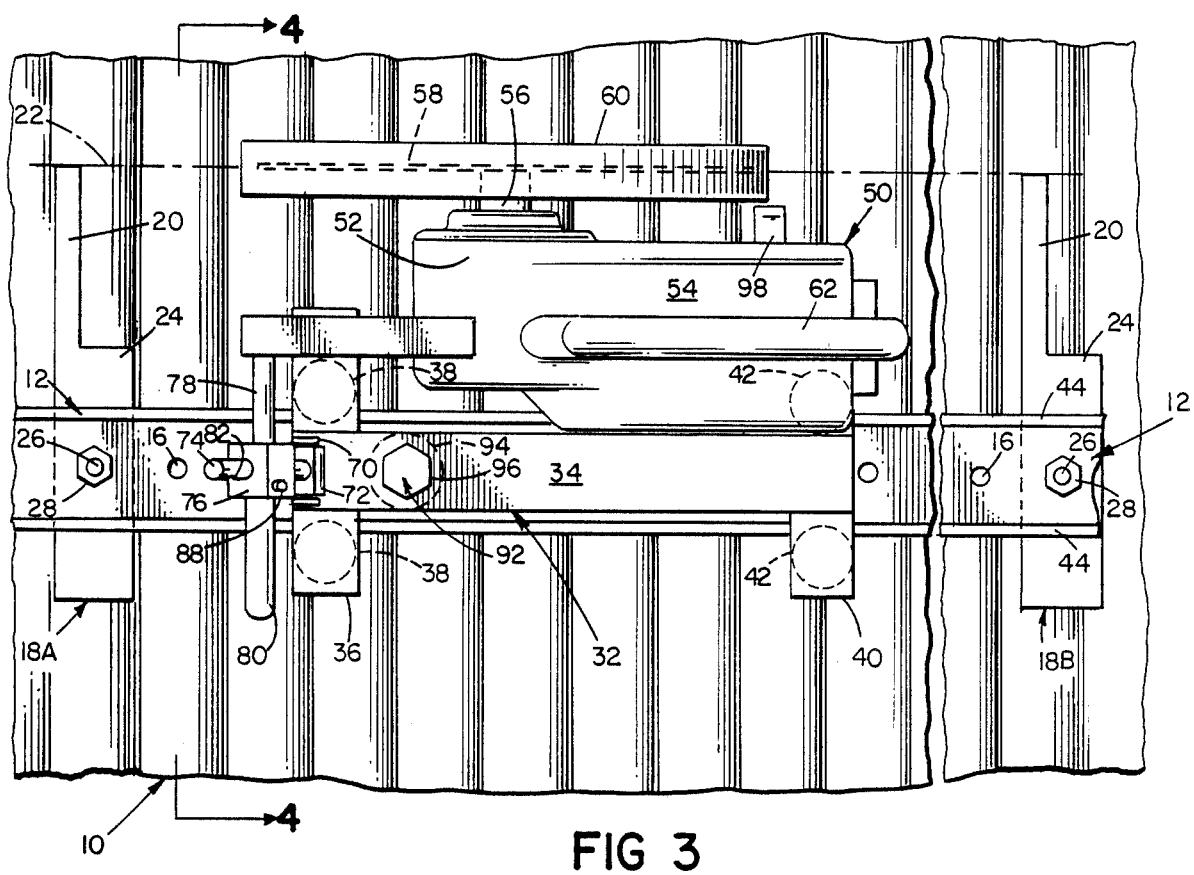
FIG. 3 is a side elevational view, similar to FIG. 2, showing tube cutting apparatus mounted on the guide rail.
Figure 4:
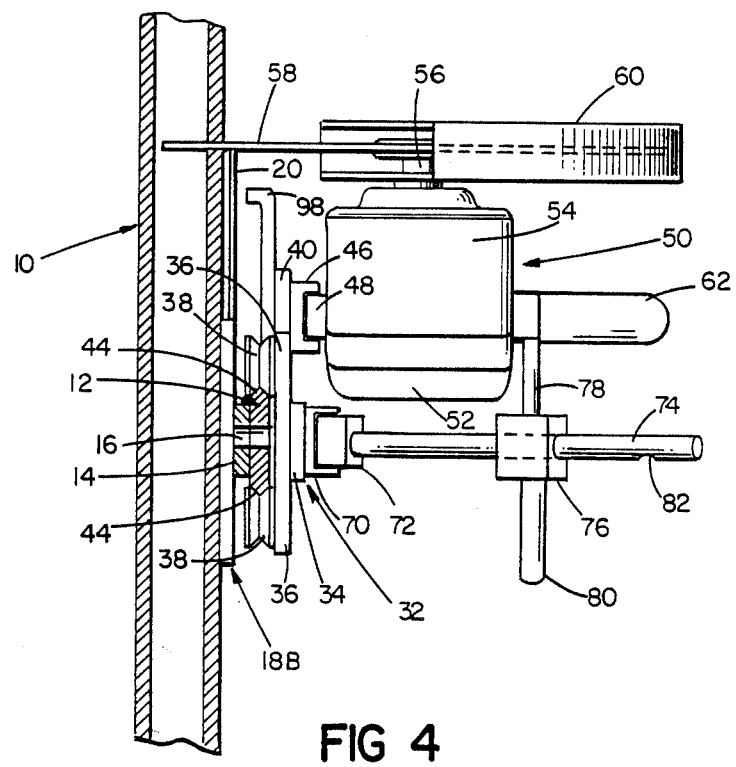
FIG. 4 is a sectional view taken along the line 44 of FIG. 3.
Figure 5:
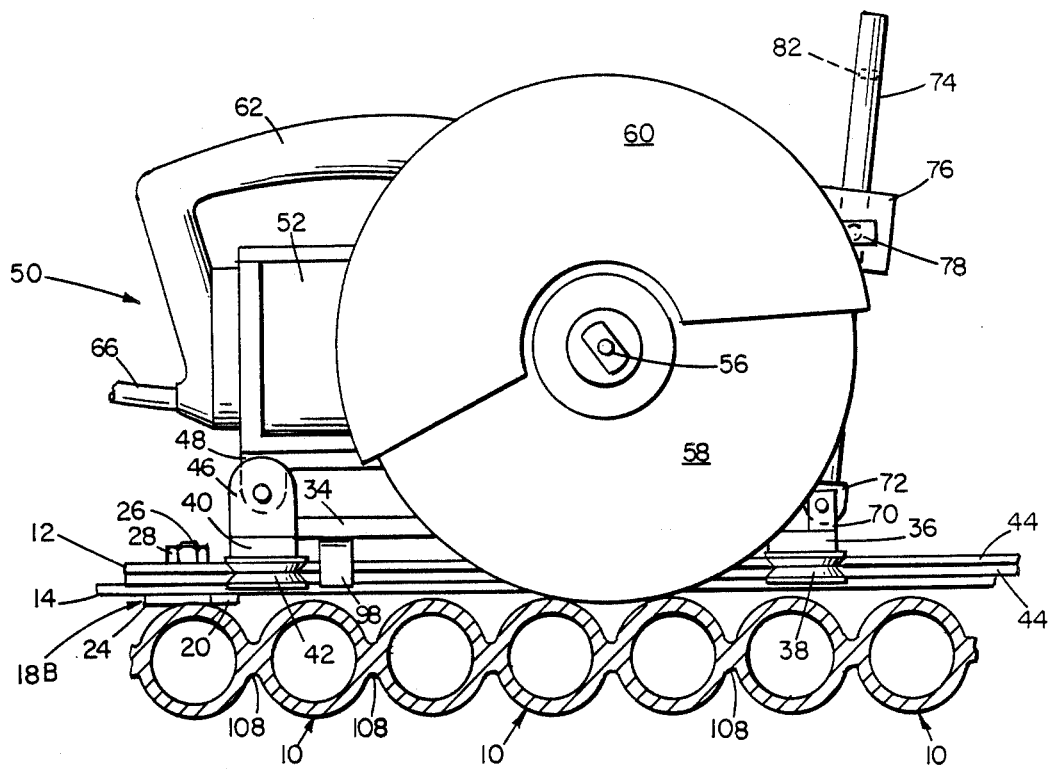
FIG. 5 is a top elevational view of the cutting tool system.

Shown in FIG. 1 is a bank of boiler tubes 10 that includes a rectangular panel of tubes that is to be replaced. Mounted on the bank of tubes 10 is elongated guide rail 12. Rail 12 includes a steel member about six feet in length and about 1¾ inch in width and about one quarter inch in thickness, and aluminum reinforcing plate 14 (FIG. 4) that is bonded to the rear surface of guide rail 12. Apertures 16 are spaced along the length of rail 12 at five inch intervals. Rail support members 18 are welded to the outer surface of spaced tubes as indicated in FIGS. 1 and 2. Each rail support 18 includes an alignment projection 20 whose end is positioned immediately adjacent the desired cut line 22 on the boiler tube panel; and a body portion 24 which is welded to a boiler tube surface and which carries an upstanding stud 26. Rail 12 is secured on supports 18 by nuts 28.

Mounted on rail 12 is cutting tool assembly 30 that includes carriage 32 which has longitudinal frame member 34, forward transverse frame member 36 on which a first pair of spaced guide wheels 38 are mounted for rotation, and a rear transverse frame member 40 on which a second pair of spaced guide wheels 42 are mounted. Each guide wheel 38, 42 has a V-groove that engages a correspondingly shaped guide surface 44 of guide rail 12. Secured to rear transverse frame member 40 is main pivot bracket 46 on which support 48 is pivotably mounted. Secured to support 48 is cutting tool 50 that includes motor housing 52, drive gear housing 54, drive shaft 56 on which cutter disc 58 is secured, and disc protective housing 60. Tool 50 also has handle 62 which carries manually operable control switch 64. Power is supplied to motor 52 (a 5,000 rpm three horsepower motor) by heavy duty high amperage power supply cord 66.

Figure 6:
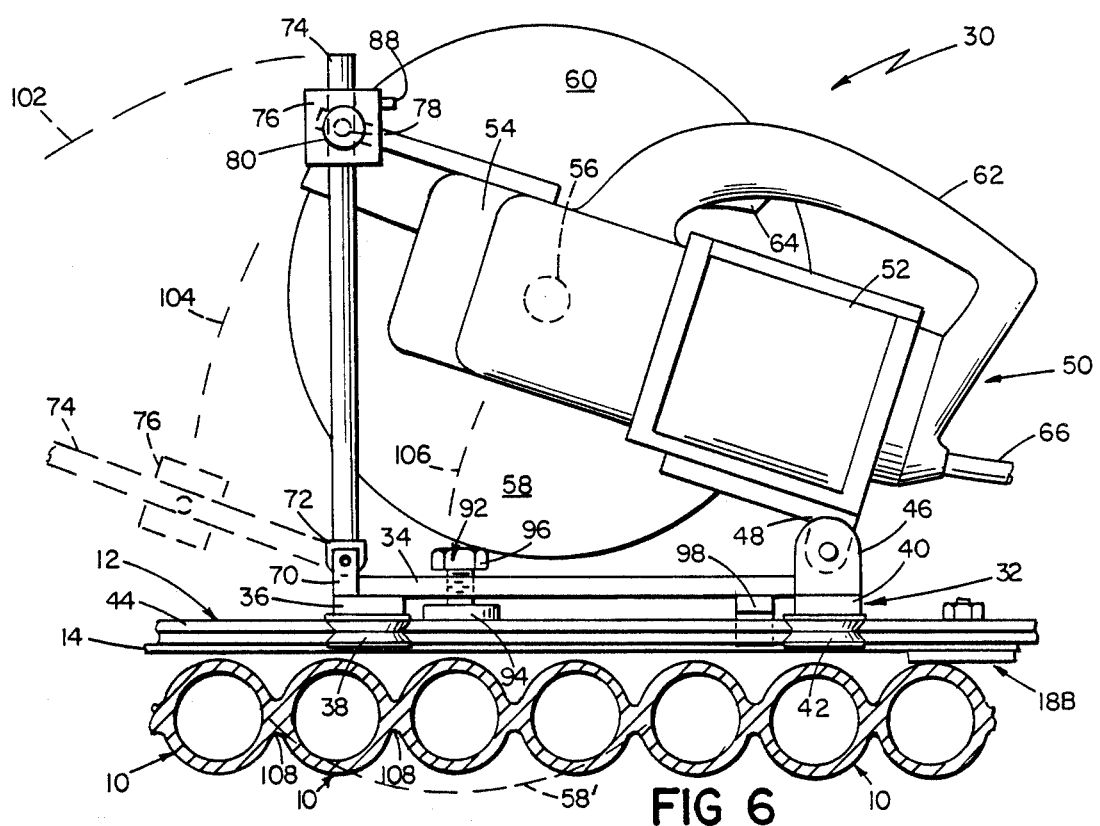
FIG. 6 is a diagrammatic view of the cutting tool system from the side opposite that of FIG. 5.

With reference to FIGS. 3-6, secured to forward transverse carriage frame member 36 is plunge cut pivot bracket 70 that carries pivot socket 72 in which is received plunge cut lever 74 for rotation movement about a transverse pivot axis plunge cut defined by pivot bracket 70. Slindingly received on lever arm 74 is plunge cut coupling 76 to which is rotatably attached support link 78 that is secured to the upper surface of gear housing 54. Plunge cut handle 80 is attached to coupling 76. Recess 82 in plunge cut lever 74 coooperates with a latch mechanism that includes a spring-biased latch member housed in coupling 76 that latches the cutting tool assembly 30 in raised position (as shown in FIG. 6) and is operable by latch actuator 88. The latch member is released by depression of latch actuator 88 to disengage the latch member from lever recess 82 and allow coupling 76 to slide along lever 74.

Mounted on longitudinal frame member 34 of the tool carriage is brake assembly 82 that includes brake shoe 84 and operating member 86, shoe 84 being movable by operating member 86 between a raised position (shown in FIG. 6) and a lower position (shown in FIG. 5) in which shoe 84 is engaged with the surface of guide rail 12 to lock the cutting tool assembly 30 in place on rail 12. Stand member 98 extends laterally from longitudinal frame member 34 and cooperates with guide wheels 38 to provide a stable support for the cutting tool assembly 30 on the floor or other surface when not in use.

In use, as indicated in FIGS. 1 and 2, an operator 90 (on vertically adjustable scaffolding—not shown) locates a desired cut line 22, welds a first rail support 18A to a boiler tube with the end of its alignment tab 20 immediately adjacent the cut line 22. Rail 12 is then mounted on the stud 26A of the fixed support 18A and secured with nut 28A. A second rail support 18B is then similarly loosely secured to rail 12 with secured nut 28B and its alignment tab 20B similarly positioned adjacent cutting line 22. The body of weld tab 18B is then tack welded in place on the boiler tube and the nuts 28A, 28B tightened on their respective coupling studs 26 to secure rail 12 parallel to, but offset from cut line 22.

The cutting tool assembly 30 is then mounted on rail 12 by sliding guide wheels 38, 42 onto the rail edge surfaces 44, as indicated in FIG. 1, there being sliding clearance between transverse frame members 36, 40 and studs 26. In that position, cutter disc 58 is located in alignment with cut line 22. The tool carriage is then locked in place with brake assembly 92. Motor 50 is then energized with control switch 62 and the operator 100 releases latch 88 and urges handle 80 towards rail 12, rotating plunge cut lever 74 forward about the axis of pivot bracket 70 (as indicated in FIG. 1 and by line 102 in FIG. 6). That rotational movement of plunge cut lever 74 causes coupling 76 to slide along rod 74 along a path 104 (about the axis of main pivot 46). As plunge cut lever 34 is rotated forwardly towards the boiler tubes, cutter disc 58 is moved along arc 106 into and cuts through the boiler tubes 10 and their interconnecting membranes 108 in a plunge cutting stroke (to a position indicated by dotted line 58' in FIG. 6). After the boiler tube plunge cut stroke has been completed, the operator 100 raises handle 80, rotating plunge cut lever 74 in the opposite direction to raise the cutting tool 50, and optionally latch the tool in raised position. After the cutter disc 58 is clear of the boiler tubes 10, the operator releases the brake 92 and advances the cutting tool assembly along rail 12 to reposition the assembly 30 for the next plunge cutting stroke.

Contiguous plunge cutting strokes are successively repeated to produce the cut line 22 as generally indicated in FIG. 1 (the cut line being straight but appearing to vary due to the location of the boiler tubes 10 in the boiler wall). After the series of contiguous plunge cuts have been made along the length of the rail, the cutter disk 58 may be energized and the disc rotated into the position 56' and the tool assembly slid along the rail to provide a smooth linear cut surface of the tubes 10 and membranes 108.

After other horizontal and vertical cuts are made through the boiler tubes on four sides, the resulting rectangular panel of tubes to be replaced is removed, and the exposed cut surfaces of the boiler tubes are appropriately end prepped for insertion and welding of the replacement boiler tube panel. When not in use, the cutting tool assembly 30 may be removed from the rail 12 and set on a suitable storage surface, the plunge cut latch holding the cutter disc clear of the surface and the guide wheels 38 and stand arm 98 providing stable support.

This system provides accurate and efficient removal of a panel of boiler tubes with aligned cut tube surfaces, in contrast with prior boiler tube cutting systems.

While a particular embodiment of the invention has been shown and described, various modifications thereof will be apparent to those skilled in the art, and therefore it is not intended that the invention be limited to the disclosed embodiment, or to details thereof, and departures may be made therefrom within the spirit and scope of the invention.

What is claimed is:

1. Boiler tube panel removal apparatus comprising elongted guide rail structure for securing to a boiler tube panel adjacent a desired cut region, and a cutting tool assembly for mounting on said guide rail structure,
   said cutting tool assembly including a support carriage with spaced guide structure for engaging said guide rail structure, main pivot structure secured to said support carriage having a pivot axis extending transversely to said guide rail structure,
   a cutting tool mounted on said main pivot that includes a drive motor, a manual motor control, a drive shaft and a tube cutter disc mounted on said drive shaft at right angles to said main pivot axis,
   secondary pivot structure secured to said support carriage, plunge cut link structure mounted on said secondary pivot structure that includes a first link connected to said cutting tool and a second link connected between said first link and said secondary pivot axis for manually rotating said cutting tool about said main pivot axis in plunge cutting action through a panel of tubes adjacent said guide rail structure and brake structure for engagement with said guide rail structure to lock said support carriage relative to said panel of boiler tubes during said plunge cutting operation.

2. The apparatus of claim 1 wherein said elongated guide rail structure is secured to said boiler tube panel by a plurality of rail supports, each said rail support including an alignment projection whose end is adapted to be positioned immediately adjacent the desired cut line on the boiler tube panel, and a body portion which is adapted to be secured to a boiler tube surface and which carries upstanding rail fastening means.

3. The apparatus of claim 1 wherein said support carriage includes a longitudinal frame member, a forward transverse frame member on which said secondary pivot structure and a first pair of spaced guide wheels are mounted, and a rear transverse frame member on which said main pivot structure and a second pair of spaced guide wheels are mounted.

4. The apparatus of claim 3 wherein each said guide wheel has a groove that engages a correspondingly shaped guide surface of said guide rail.

5. The apparatus of claim 3 wherein said secondary pivot structure carries a pivot socket in which is received said second link, and a plunge cut coupling to which said first link is rotatably attached is slidingly received on said second link.

6. The apparatus of claim 1 and further including manually releasable latch structure cooperating with said plunge cut link structure for holding said cutting tool in raised position, and stabilizing structure on said support carriage for storing said cutting tool assembly in upright position when not in use.

7. The apparatus of claim 1 wherein said brake structure includes a brake shoe and an operating member, said shoe being movable by said operating member between a disengaged position and an engaged position in which said shoe is engaged with the surface of said guide rail to lock said cutting tool assembly in place on said rail.

8. The apparatus of claim 7 wherein said elongated guide rail structure is secured to said boiler tube panel by a plurality of rail supports, each said rail support including an alignment projection whose end is adapted to be positioned immediately adjacent the desired cut line on the boiler tube panel, and a body portion which is adapted to be secured to a boiler tube surface and which carries upstanding rail fastening means.

9. The apparatus of claim 7 wherein said support carriage includes a longitudinal frame member, a forward transverse frame member on which said secondary pivot structure and a first pair of spaced guide wheels are mounted, and a rear transverse frame member on which said main pivot structure and a second pair of spaced guide wheels are mounted.

10. The apparatus of claim 9 wherein each said guide wheel has a groove that engages a correspondingly shaped guide surface of said guide rail.

11. The apparatus of claim 9 and further including manually releasable latch structure cooperating with said plunge cut link structure for holding said cutting tool in raised position, and stabilizing structure on said support carriage for storing said cutting tool assembly in upright position when not in use.

12. The apparatus of claim 11 wherein said secondary pivot structure carries a pivot socket in which is received said second link, and a plunge cut coupling to which said first link is rotatably attached is slidingly received on said second link.

13. The apparatus of claim 12 wherein said elongated guide rail structure is secured to said boiler tube panel by a plurality of rail supports, each said rail support including an alignment projection whose end is adapted to be positioned immediately adjacent the desired cut line on the boiler tube panel, and a body portion which is adapted to be secured to a boiler tube surface and which carries upstanding rail fastening means.

14. Boiler tube panel removal apparatus comprising elongated guide rail structure for securing to a boiler tube panel adjacent a desired cut region, and a cutting tool assembly for mounting on said guide rail structure, said cutting tool assembly including a support carriage with spaced guide structure for engaging said guide rail structure, main pivot structure secured to said support carriage having a pivot axis extending transversely to said guide rail structure, a cutting tool mounted on said main pivot structure that includes a drive motor, a manual motor control, a drive shaft and a tube cutter disc mounted on said drive shaft at right angles to said main pivot axis, plunge cut link structure secured to said support carriage, said plunge cut link structure including a first link connected to said cutting tool and a second link connected between said first link and said secondary pivot axis for manually rotating said cutting tool about said main pivot axis in plunge cutting action through a panel of tubes adjacent said guide rail structure, manually releasable latch structure for latching said plunge cut link structure to hold said cutting tool in raised position, and stabilizing structure on said support carriage for storing said cutting tool assembly in upright position when not in use.

15. The apparatus of claim 14 wherein said support carriage includes a longitudinal frame member, a forward transverse frame member on which secondary pivot structure and a first pair of spaced guide wheels are mounted, and a rear transverse frame member on which said main pivot structure and a second pair of spaced guide wheels are mounted, said stabilizing structure includes an arm that projects laterally from said longitudinal frame member beneath said cutting tool, said secondary pivot structure carries a pivot socket in which said second link is received, said plunge cut link structure includes a plunge cut coupling to which said first link is rotatably attached and which is slidingly carried by said second link, and said manually releasable latch structure releasably latches said plunge cut coupling and said first link together to prevent relative sliding movement between said plunge cut coupling and said first link.

16. The apparatus of claim 15 wherein said elongated guide rail structure is secured to said boiler tube panel by a plurality of rail supports, each said rail support including an alignment projection whose end is adapted to be positioned immediately adjacent the desired cut line on the boiler tube panel, and a body portion which is adapted to be secured to a boiler tube surface and which carries upstanding rail fastening means, and each said guide wheel has a groove that engages a correspondingly shaped guide surface of said guide rail.

17. Apparatus for repairing a panel of boiler tubes comprising elongated guide rail structure for mounting on the panel of boiler tubes to be repaired, a cutting tool assembly including support carriage structure with spaced guide structure for engaging said guide rail structure, pivot structure secured to said carriage structure and defining a pivot axis, a cutting tool secured to said carriage structure for pivoting movement about the pivot axis defined by said pivot structure, said cutting tool including a drive motor, a manual motor control, a drive shaft, and a cutter disc mounted on said drive shaft and adapted to be driven in rotation by said drive motor in response to said manual motor control, and brake structure for engagement with said guide rail structure to lock said support carriage structure relative to said panel of boiler tubes during operation of said cutting tool.

18. The apparatus of claim 17 wherein said support carriage includes frame structure including a forward portion on which a first pair of spaced guide wheels are mounted and a rear portion on which a second pair of spaced guide wheels are mounted.

19. The apparatus of claim 17 wherein said guide rail structure includes a metal strip with parallel shaped guide surfaces at its opposed edges that extend along its length, and each said guide wheel has a groove that engages a corresponding one of said shaped guide surfaces of said metal guide strip.

20. The apparatus of claim 17 wherein said brake structure includes a brake shoe and an operating member, said brake shoe being movable by said operating member between a disengaged position in which said shoe is spaced from said guide rail structure and an engaged position in which said shoe is engaged with a surface of said guide rail structure to lock said cutting tool assembly in place on said guide rail structure.

21. The apparatus of claim 17 and further including a plurality of rail supports for securing said elongated guide rail structure to said boiler tube panel, each said rail support including an alignment projection whose end is adapted to be positioned immediately adjacent a desired cut line on the boiler tube panel, and a body portion which is adapted to be secured to a boiler tube surface and which carries upstanding rail fastening means.

* * * * *